(No Model.)

M. H. DAUBS.
PLOW ATTACHMENT.

No. 592,905.  Patented Nov. 2, 1897.

WITNESSES

INVENTOR
Michael H. Daubs,
By John Hedderburn
Attorney

UNITED STATES PATENT OFFICE.

MICHAEL H. DAUBS, OF ALBION, ILLINOIS.

PLOW ATTACHMENT.

SPECIFICATION forming part of Letters Patent No. 592,905, dated November 2, 1897.

Application filed March 16, 1897. Serial No. 627,752. (No model.)

*To all whom it may concern:*

Be it known that I, MICHAEL H. DAUBS, a citizen of the United States, residing at Albion, in the county of Edwards and State of Illinois, have invented certain new and useful Improvements in Plow Attachments; and I do hereby declare the following to be a full, clear, and exact description of the invention, such as will enable others skilled in the art to which it appertains to make and use the same.

This invention relates to plow attachments; and it consists in the present instance of a spring-actuated automatically-adjustable arm for casting aside or throwing over weeds adjacent to a plowshare in order that they may be thoroughly covered or embedded during the plowing action.

The object of the invention is to facilitate the use of a plow through tracts of weeds or other projecting stalks and insure a thorough covering of the said obstructions by a simple mechanism which is detachably applied to a plow-beam or adjacent portion of a plow.

Figure 1:
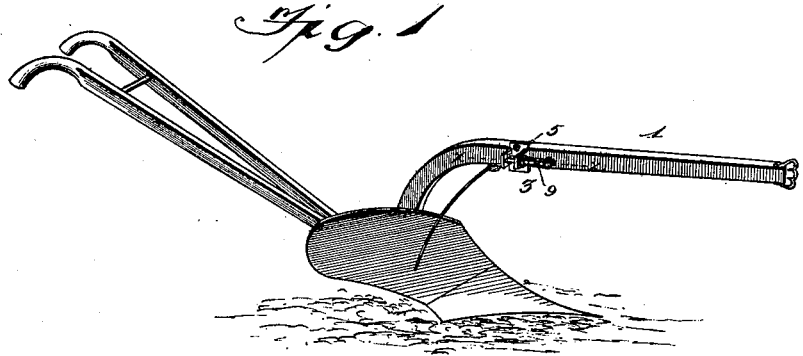
Figure 2:
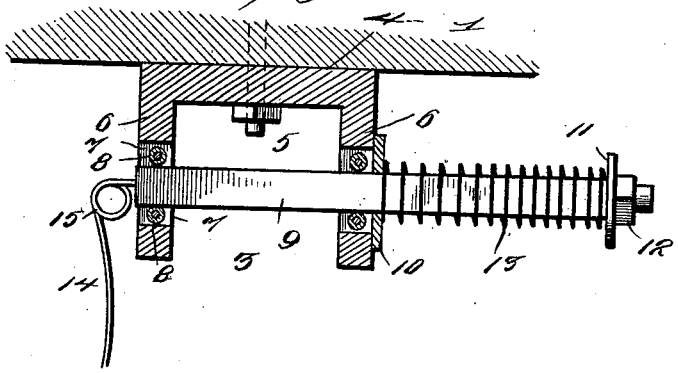
Figure 3:
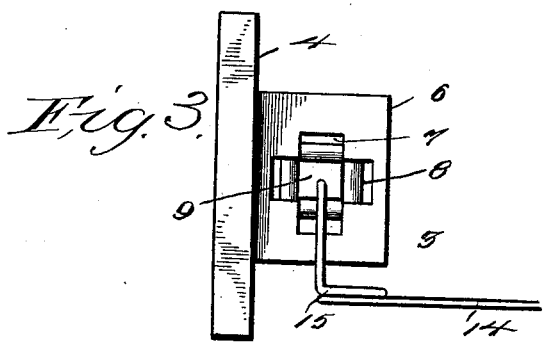

In the drawings, Figure 1 represents a perspective view of the plow, showing the improved attachment applied thereto. Fig. 2 is a section on the line $x\,x$, Fig. 1, on an enlarged scale. Fig. 3 is an end elevation of the improved device.

Referring to the drawings, wherein like numerals of reference are employed to indicate corresponding parts in the several views, the numeral 1 designates a plow-beam of any suitable form of plow.

The frame 3 of the improved attachment comprises a back 4, formed with suitable slots to receive the ends of a clip 5, which are mounted over the plow-beam 1 to secure the attachment in position. Extending outwardly from the said back 4 and at opposite sides thereof are heads 6, which are slotted, and in the four walls of each slot are recesses 7, in which are mounted antifrictional rollers 8, suitably spaced apart and having passing therethrough an adjustable bar 9. Against the outer surface of one of the heads rests a collar or washer 10, having an angular opening therein to correspond to the contour of the bar 9, and on the outer end of the said bar 9 is a second washer 11, held in removable position by a nut 12. Between the washers 10 and 11 a coiled spring 13 is mounted and surrounds the bar and has the function of sustaining the latter in its normal position. To the opposite end of the said bar 9 is secured the upper end of a resilient arm 14, which curves downward over an adjacent portion of the plowshare and has in the body thereof one or more coils 15 to absorb a shock or jar on said arm by the latter striking a resisting projection.

In the operation of plowing the arm 14 overhangs the plowshare and turns the weeds downward to one side, so that the soil thrown up by the plow into an adjacent furrow will cover said weeds. The drawing motion on the arm in passing through dense or heavy weeds or over stalks will cause the bar 9 to move backwardly against the action of the spring 13 through the heads 6, extending from the back 4 of the attachment, and thereby avoid breakage of the arm or dismemberment of the parts of the device. During the said automatic adjustment of the bar 9 wear thereon is obviated, as well as on the heads through which it passes, by the operation and engagement of the antifriction-rollers hereinbefore referred to. The arm 14 is preferably made of spring-steel, and the bar 9 in like manner is intended to be constructed of suitable metal. The entire construction of the parts will be made as light as consistent with strength, and the arm 14 as well as the bar 9 can be varied in their dimensions to suit different forms of plows.

It is obviously apparent that many minor changes in the details of construction might be made and substituted for those shown and described without in the least departing from the nature or spirit of the invention.

Having thus described the invention, what is claimed as new is—

1. In a plow attachment, the combination of a frame with opposite slotted heads having rollers mounted therein, a spring-actuated bar adjustably engaging said rollers, and a resilient arm carried by one end of said bar, which curves downwardly over an adjacent portion of the plow-shaft, substantially as described.

2. In a plow attachment of the character set forth, the combination with a plow-beam, of a frame having opposite heads with slots formed therein, antifrictional rollers located in said slots, a spring-actuated bar movably mounted between said rollers, a collar or washer engaging one of said heads, and a yielding arm connected to one end of said bar and extending downwardly over an adjacent portion of the plow-shaft, said arm having a coil in the body thereof, substantially as described.

In testimony whereof I have signed this specification in the presence of two subscribing witnesses:

MICHAEL H. DAUBS.

Witnesses:
WILLIAM R. STRAWN,
ANDREW T. BLAKELY.